(12) United States Patent
Proust et al.

(10) Patent No.: US 8,201,211 B2
(45) Date of Patent: Jun. 12, 2012

(54) METHOD FOR SELECTING AN EXECUTABLE SOFTWARE IMAGE

(75) Inventors: Laurent Proust, Paris (FR); Dominique Hamery, Rueil Malmaison (FR)

(73) Assignee: THOMSON Licensing S.A., Boulogne-Billancourt (FR)

( * ) Notice: Subject to any disclaimer, the term of this patent is extended or adjusted under 35 U.S.C. 154(b) by 1508 days.

(21) Appl. No.: 10/475,844

(22) PCT Filed: May 7, 2002

(86) PCT No.: PCT/FR02/01567
§ 371 (c)(1),
(2), (4) Date: Mar. 25, 2004

(87) PCT Pub. No.: WO02/091099
PCT Pub. Date: Nov. 14, 2002

(65) Prior Publication Data
US 2004/0146270 A1    Jul. 29, 2004

(30) Foreign Application Priority Data
May 9, 2001  (FR) ..................................... 01 06112

(51) Int. Cl.
 H04N 7/16   (2011.01)
 H04N 7/173  (2011.01)
 G06F 9/44   (2006.01)
 G06F 9/445  (2006.01)

(52) U.S. Cl. ........ 725/140; 725/132; 725/134; 725/142; 725/152; 717/168; 717/172; 717/174; 707/999.203

(58) Field of Classification Search .................. 725/132, 725/134, 140, 142, 152; 717/168, 172, 174; 707/999.203
See application file for complete search history.

(56) References Cited

U.S. PATENT DOCUMENTS

| | | | | |
|---|---|---|---|---|
| 5,535,399 A | * | 7/1996 | Blitz et al. | 714/6.1 |
| 5,622,162 A | * | 4/1997 | Johansson et al. | 128/200.14 |
| 5,652,886 A | * | 7/1997 | Tulpule et al. | 713/2 |
| 5,771,064 A | * | 6/1998 | Lett | 725/134 |
| 5,835,864 A | * | 11/1998 | Diehl et al. | 725/140 |
| 5,838,383 A | * | 11/1998 | Chimoto et al. | 348/553 |
| 5,951,639 A | * | 9/1999 | MacInnis | 725/70 |
| 6,016,400 A | * | 1/2000 | Day et al. | 717/175 |
| 6,092,189 A | * | 7/2000 | Fisher et al. | 713/1 |
| 6,173,417 B1 | * | 1/2001 | Merrill | 714/15 |
| 6,317,162 B1 | * | 11/2001 | Matsumoto | |

(Continued)

FOREIGN PATENT DOCUMENTS

EP             0 700 205         3/1996

(Continued)

*Primary Examiner* — Brian Pendleton
*Assistant Examiner* — Pinkal R Chokshi
(74) *Attorney, Agent, or Firm* — Oblon, Spivak, McClelland, Maier & Neustadt, L.L.P.

(57) ABSTRACT

An apparatus and an associated methodology is provided to select and run an image of an executable software, the method including the steps of: starting a self executable boot and load software stored in the apparatus configured to run an executable software image; reading a table stored internally in the apparatus by the self executable boot and load software, referencing an executable software images that are stored in the apparatus; selecting an uncorrupted executable software image from one of the executable software images that are referenced in the table; and starting the image chosen by said selecting.

15 Claims, 3 Drawing Sheets

U.S. PATENT DOCUMENTS

| | | | |
|---|---|---|---|
| 6,331,876 B1 * | 12/2001 | Koster et al. | 348/725 |
| 6,343,299 B1 * | 1/2002 | Huang et al. | 707/638 |
| 6,343,379 B1 * | 1/2002 | Ozawa et al. | 725/63 |
| 6,418,555 B2 * | 7/2002 | Mohammed | 717/169 |
| 6,449,682 B1 * | 9/2002 | Toorians | 711/100 |
| 6,519,762 B1 * | 2/2003 | Colligan et al. | 717/170 |
| 6,525,775 B1 * | 2/2003 | Kahn et al. | 348/460 |
| 6,532,591 B1 * | 3/2003 | Arai et al. | 725/132 |
| 6,584,080 B1 * | 6/2003 | Ganz et al. | 370/315 |
| 6,591,376 B1 * | 7/2003 | VanRooven et al. | 714/36 |
| 6,704,933 B1 * | 3/2004 | Tanaka et al. | 725/132 |
| 6,715,074 B1 * | 3/2004 | Chaiken | 713/164 |
| 6,912,711 B1 * | 6/2005 | Curtis et al. | 717/173 |
| 6,931,523 B1 * | 8/2005 | Tomoson et al. | 713/100 |
| 6,931,552 B2 * | 8/2005 | Pritchard et al. | 726/34 |
| 6,970,960 B1 * | 11/2005 | Sarfati | 710/106 |
| 6,981,253 B2 * | 12/2005 | Asada et al. | 717/178 |
| 7,051,325 B2 * | 5/2006 | Choi et al. | 717/168 |
| 7,069,578 B1 * | 6/2006 | Prus et al. | 725/132 |
| 7,165,265 B2 * | 1/2007 | Mori et al. | 725/89 |
| 7,409,546 B2 * | 8/2008 | Platt | 713/165 |
| 7,689,983 B2 * | 3/2010 | Kitayama | 717/170 |
| 7,774,820 B2 * | 8/2010 | Prus et al. | 725/132 |
| 2001/0005902 A1 * | 6/2001 | Bacon et al. | 725/50 |
| 2002/0019938 A1 * | 2/2002 | Aarons | 713/168 |
| 2002/0042870 A1 * | 4/2002 | Rocray et al. | 712/10 |
| 2002/0087965 A1 * | 7/2002 | Lin | 717/174 |
| 2002/0120931 A1 * | 8/2002 | Huber et al. | 725/34 |
| 2002/0188942 A1 * | 12/2002 | Bryan et al. | 717/176 |
| 2006/0248542 A1 * | 11/2006 | Wang et al. | 719/321 |

FOREIGN PATENT DOCUMENTS

| | | |
|---|---|---|
| EP | 0 998 141 | 5/2000 |
| WO | 01/58146 | 8/2001 |

* cited by examiner

METHOD FOR SELECTING AN EXECUTABLE SOFTWARE IMAGE

TECHNICAL FIELD

The invention relates to a process for selection and starting an image, in other words a copy of an executable software, for example to process reception of a digital television program. It is particularly applicable in the field of digital television decoders.

STATE OF THE ART

Existing digital television decoders have resident software that is the image of an executable software, that is for example executed every time that the decoder is switched on. This image is used to process programs received by the decoder to transform the received digital signal into a video signal in the broad sense of the term, in other words into a signal containing an image, sounds, synchronization signals, and also possibly text and in general a set of information that can be transformed into meaningful signals for a user of a terminal station comprising the decoder. The resident software may be stored in a memory of the decoder. It may also be loaded into this memory from an information stream received by the decoder. The resident or loaded software can be executed, or the software can possibly be loaded from a received digital flow, due to the presence of the boot software and loading software. The boot software and the loading software comprise an initial set of instructions with a cross reference to a resident software start address. The loading software started by the boot software checks that the resident software is present and is uncorrupted. It contains instructions necessary to load an executable software if necessary, and to start it from the digital data stream received by the decoder if returned information signals that there is no image present in any of the decoder storage means. If it is confirmed that there is an uncorrupted image present, or after the image has been loaded from the digital data stream if necessary, the loading software loads the resident software into a memory area in which it can be executed, and then executes it. The resident software is executed to decode the received programs. The entire resident software including the boot software and the loading software are stored in a memory of the decoder. The boot and the loading software are stored in a non erasable part of memory or preferably have erase protection by software. The resident executable software is stored in an erasable part of memory. If the resident software is loaded from the digital data stream received by the decoder, the received software will overwrite the software that is already resident in the erasable memory area, if any, in which the said software will be stored. The loading software is also used to load a new image or to update a resident image from the digital data stream.

BRIEF DESCRIPTION OF THE INVENTION

In the current state of the art, only one executable software image is stored. Regardless of whether it was previously loaded from the broadcast stream or was resident, this software is executed from the memory in which it was loaded to be executed.

According to this invention, it is intended to store several executable software images in the decoder. Therefore, the invention relates to a process as described below, starting from the boot and loading software provided with the decoder by the decoder manufacturer, to select one of the images of the executable software among the images of the software stored in the decoder on a decoder memory, decompress the selected software image if the selected software image is stored in compressed form, if necessary, load the image of the software selected from the memory in which it is stored, into a memory from which it can be executed, for example to load it into a fast memory if the image of the selected software is initially stored on a hard disk, finally run the image of the selected software.

Obviously, the process according to the invention can be used to load an executable from the data stream, in the same way as in prior art, if there is no image of the executable software available in a memory of the decoder of if the available image is corrupted or if it is a superseded version that needs to be replaced.

In summary, the invention relates to a process that can be used in a digital television reception set, for example in a digital television reception decoder to select and run an image of an executable software, the process including starting a self executable boot software to run an image, the process being characterized in that the boot software and the loading software include the following steps:

c) read a table internal to the reception set, referencing an integer number n greater than 1 of executable software images, in a predetermined order, s) selecting an uncorrupted image of the executable software, l) starting the selected image for execution.

Preferably, a step v1) is carried out before step c) to check that the boot software table is present and is uncorrupted.

In general, before the process according to the invention is executed, the references table containing an integer number n of references will have been created, each reference in the table containing a univocal cross reference to one of n images stored in a memory area, the self executable boot software containing a cross reference to the said boot software table, and then according to a routine carried out every time that the decoder is switched on or reinitialized:

v1) it is checked that the boot software table is present and is uncorrupted, p) the table is read in a predetermined order to reach the references of the table in the order of preference of the stored images corresponding to each reference in the table, v2) it is checked that the image corresponding to the first reference in the table reached by reading the table is uncorrupted, l) if the image checked in step v2) is uncorrupted, the said image may be loaded and execution of this image is started, e) if the image is corrupted, then the next current reference in the table after the previous reference is selected in the predetermined read order, and step v2) (and possibly step l) if the current image is uncorrupted) are carried out, and if it is corrupted, step e) is started again for the next reference in the order of reading the table until an uncorrupted image is found.

Preferably, the n images are distributed in two parts, a first part composed of an integer number (n–m) of images stored in erasable parts of memory and a second part complementary to the first part composed of an integer number of images m less than or equal to n stored in parts of non erasable memory or areas with erase protection.

In this case, in preference the select reference step s) and the check integrity step v2) are carried out firstly for the (n–m) images contained in memory areas without erase protection, then if none of these images is uncorrupted, for the m images contained in the memory areas that are non erasable or with erase protection.

Preferably, the m images stored in the memory areas that are non erasable or with erase protection are stored on different media, such that there is not more than one image with erase protection on each medium, for example an image on the hard disk and an image on a fast memory.

If the table is corrupted, or if none of the images found by reading the entire table and making the check v2) firstly of the (n–m) images stored in a memory area without erase protection are uncorrupted, then the selection step a) and the check step v2) are repeated, and possibly the loading step and then the run step l) are also repeated, for the m images stored in the memory area with erase protection, these m images being read in a predetermined order corresponding to an order of preference.

In the step prior to execution of the process to create the reference table, an integer number n of images is loaded into the decoder, preferably distributing them into (n–m) images stored in memory areas without erase protection and m images stored in memory areas with erase protection, with one image per storage medium.

According to one embodiment, the memory areas with erase protection in which the m images are stored are memory areas on a hard disk.

According to one embodiment, before one of the images is loaded for execution, it is checked that this image is not stored in a compressed mode, and if it is the image is decompressed before being loaded and executed.

BRIEF DESCRIPTION OF THE DRAWINGS

An embodiment of the invention will now be explained with reference to the attached drawings in which.

DESCRIPTION OF AN EMBODIMENT

An embodiment of this invention will now be described with reference to the attached drawings.

Figure 1:
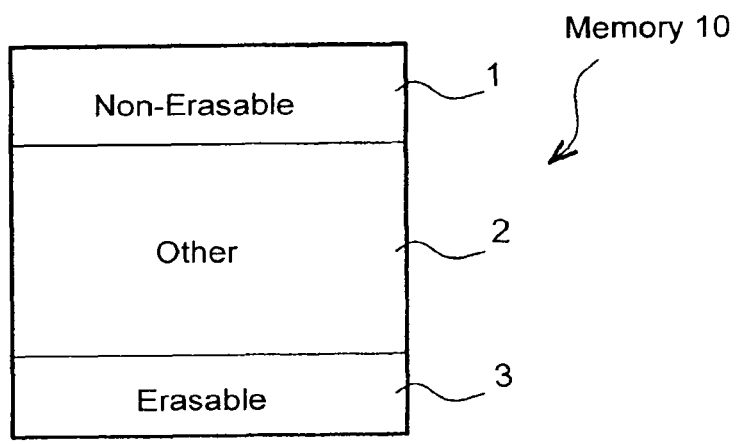
FIG. 1 is a diagrammatic view of a fast memory and its contents relative to the executable resident software according to prior art.

Firstly, the state of prior art will be summarized with reference to FIG. 1.

A first part 1 that is non erasable or with erase protection located in a fast memory 10 of a decoder, for example a "flash" type memory as loaded according to prior art, contains a boot software and a loading software. This boot software and this loading software are known and are loaded by the decoder manufacturer.

Part 2 of the memory contains other information that is not concerned by this invention.

An erasable part or a part without erase protection 3 in memory 10 contains a resident image of an executable software.

Operation is as follows. The boot software is self executed when the decoder changes from an off state to a standby or on state, or following a reinitialization. Thus, for example when the decoder is started, the boot software outputs an instruction to run the loading software. This loading software checks that the executable software image stored in part 3 of the decoder memory is present and is uncorrupted. The software means to check this integrity are known in themselves. For example, it could be a checksum or a longitudinal redundancy code (LRC) check.

If the result of the check shows that there is a software image loaded in 3 and that this image loaded in 3 is uncorrupted, then the boot software starts execution of the said executable software stored in 3 of the decoder memory. If the result of the check indicates that there is no software in 3 or that the software loaded in 3 is corrupted, then the boot software and the loading software start loading an image of an executable software from the data stream. The image loaded from the data stream then overwrites the corrupted image in 3.

Figure 2:
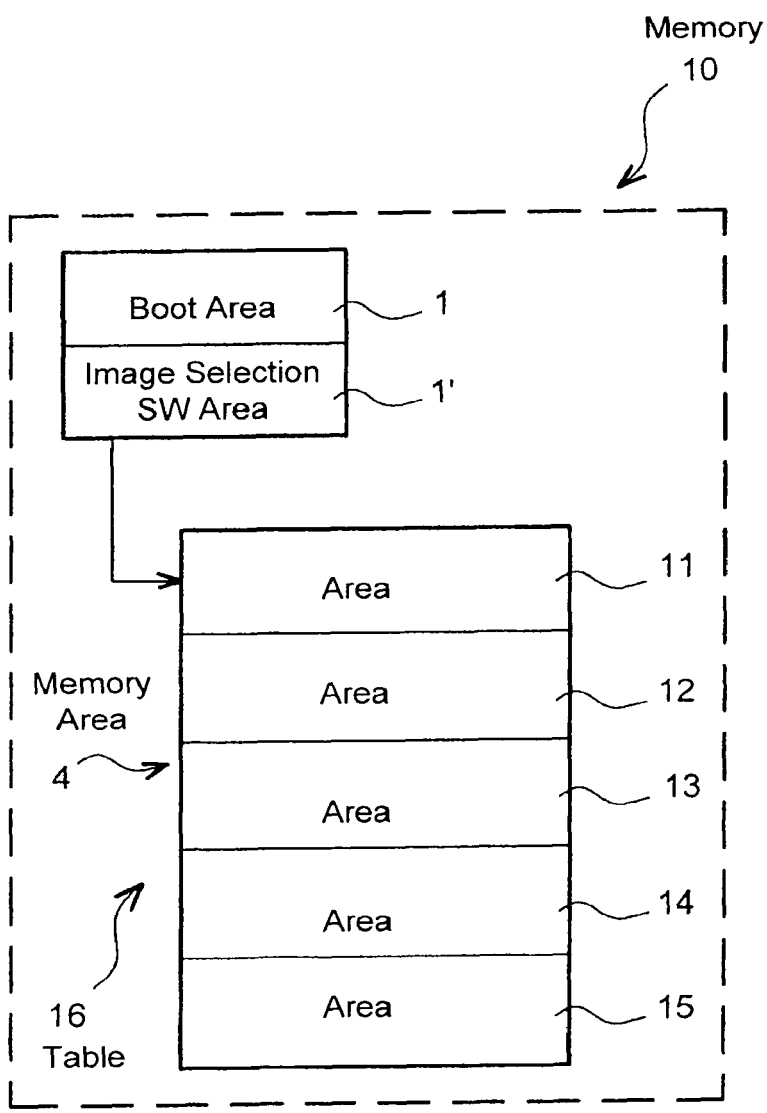
FIG. 2 shows a fast memory and a storage memory and the contents of each according to an embodiment of this invention.

The difference between one embodiment of the invention and the state of the art is that this embodiment includes several executable software images stored on different storage means in the decoder, for example a fast memory, a hard disk with a non-erasable part and an erasable part, these examples being not restrictive. Each of the executable images may be booted. The result is that the boot software contains a cross reference to a reference table 16 represented symbolically in FIG. 2. The table 16 contains one reference for each executable software image in the decoder. FIG. 2 shows the case in which n=5 and m=2. In this example, there are four executable software images in addition to the single image included in prior art. For example, the result may be an image in a memory area with erase protection on a hard disk, an image on an area with erase protection of a fast memory, and three images in areas without erase protection on the hard disk or a fast memory. The references or addresses of cross references to the first instruction for each of these images are stored in areas 11, 12, 13, 14 and 15 forming part of an area 4 of the memory, for example the fast memory 10. Thus, for example, areas 11-13 may contain cross references to memory areas on the hard disk without erase protection and areas 14 and 15 may contain cross references to addresses of non erasable memory areas or areas with erase protection on a hard disk or a fast memory. From the description point of view, reference 4 denotes the hardware support of table 16. Reference 16 denotes the information content in memory area 4. As in prior art, the area 1 of fast memory 10 contains the boot software and the loading software normally supplied with the decoder. According to this invention, the fast memory 10 has a memory area 1' containing an image selection and loading software to form the process according to the invention.

Figure 3:
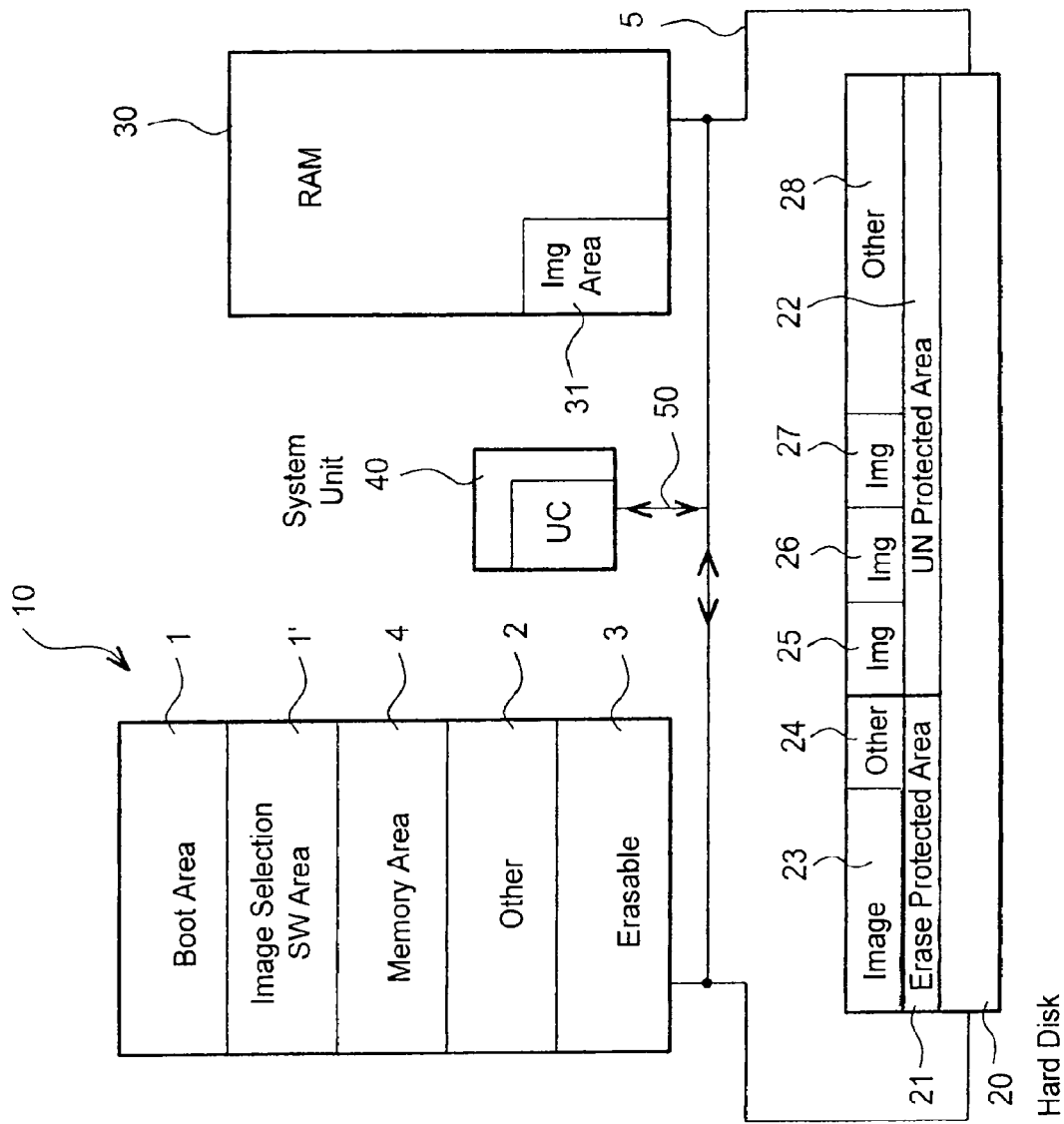
FIG. 3 is a diagrammatic view showing information storage means for a decoder incorporating the invention.

An example of a hardware system designed to form the hardware support of this invention is shown in FIG. 3.

A fast memory (flash) 10, a random access memory 30, and a hard disk forming part of a decoder or connected locally to this decoder such that it can be considered that these means are internal to the decoder, are connected to each other and to a system unit 40 through a bus 50. The hard disk 20 contains an area 21 with erase protection and an area 22 without erase protection. The area 22 without erase protection contains a first, a second and a third image of the executable software in areas 25, 26 and 27 of area 22 respectively. An area 28 not used for this invention contains other data or an empty part. The area 21 with erase protection has an area 23 containing a fourth image of an executable software. An area 24 of the area 21 not used for this invention contains other data or an empty part. When one of the four software images stored has been selected by the loading and start software stored in area 1', and if it cannot be executed directly from its support, this image is loaded for example into a part 31 of the random access memory 30.

The image selection and loading software stored in area 1' will now be described with reference to FIG. 4.

Firstly, note that the executable selection and loading software is called by the boot software stored in area 1, to be loaded for example into RAM memory if necessary for execution, and is executed. In the case described with relation to FIG. 2 in which area 1 is a fast memory area, the loading and selection software can be executed directly from its support.

The decoder manufacturer designs and loads this boot software into the decoder. The described software architecture in which a cross reference is made to the software loaded in area 1' is adopted to satisfy the need to adapt to decoders as they exist at the moment. It is obvious that the software architecture could be different for decoders designed to be adapted to the invention, the essential point being that the functions that will be described are included.

The process according to the invention is initiated after the boot software delivered with the decoder has called the software located in area 1' to select and possibly to load an executable according to this invention. Thus, according to a first modification from prior art, the instruction address specified by the boot software to check the presence and integrity of the resident software no longer corresponds to this first instruction, but rather to a cross reference instruction to the software according to the invention.

According to a first step v1) shown in 101, it is checked that the table 16' is uncorrupted and contains at least one address for an executable software image, and that it is a reliable address.

If this is not the case, the next step 102 is performed in which it is checked that the executable software image stored in the area 23 of the hard disk 20 with erase protection is present and is uncorrupted.

If the check carried out in step 102 shows that the image of the executable software stored in the area 23 of the hard disk 20 with erase protection is present and is uncorrupted, then this image may be loaded in a step 103, for example into the random access memory 30, in area 31 to be started in execution in a step 104.

If the check carried out in step 102 confirms that the executable software image stored in the area 23 on the hard disk 20 with erase protection is not present or is corrupted, then the next step 105 is carried out in which it is checked that the executable software image stored in 3 of fast memory 10 with erase protection is present and is not corrupted. If the check is positive, steps 103 and 104 are executed.

In general, if the table 16 is corrupted or if none of the images selected by the table is uncorrupted, then the m images stored in the areas with erase protection are read in a predetermined order to select and load the first of these images that is found to be uncorrupted.

If the check v1 carried out in step 101 is positive, in other words if the table 16 is uncorrupted and contains a first address for an image of an executable software, step v2 106 is carried out in which it is checked that the first image of the executable software stored in area 25 of hard disk 20 without erase protection is present and is uncorrupted. If this check is positive, then the next steps 103 and then 104 are carried out.

If the check carried out in step 106 is negative, the next image of the table 16 is selected in a step 107. The same check that was carried out in step 106 is carried out in step 108 for the second image of the executable software stored in the area 26 of the hard disk 20 without erase protection. If this check is positive, then steps 103 and then 104 are carried out.

If the check carried out in step 108 is negative, then step 107 is repeated in which the same check is carried out for the third executable software image stored in the area 27 of the hard disk 20 without erase protection. Steps 107 and 108 are started again for each image until an uncorrupted image is found. When a positive check is carried out in step 108, step 103 and then step 104 are carried out such that the third image, or in general the first uncorrupted image found in a predetermined order of reading the table 16 is executed.

In general, if table 16 is uncorrupted, then the table is read to select the first uncorrupted image referenced by the table.

The process that has just been described is used to select, and possibly load if necessary and then run the preferred image among the executable software images available in the decoder, with preference given firstly to the images stored in areas 25-27 of the hard disk 20 without erase protection and then the images in areas 23, 3 of the hard disk 20 with erase protection, or the fast memory 10 respectively. In the example commented in relation with FIGS. 2-4, the preferred images are the first, second, and third images and possibly other images if they exist, in a predetermined order of preference starting firstly with images stored in areas of the hard disk 20 without erase protection, and then images stored in areas of the hard disk 20 with erase protection, and then in the fast memory 10.

Figure 4:
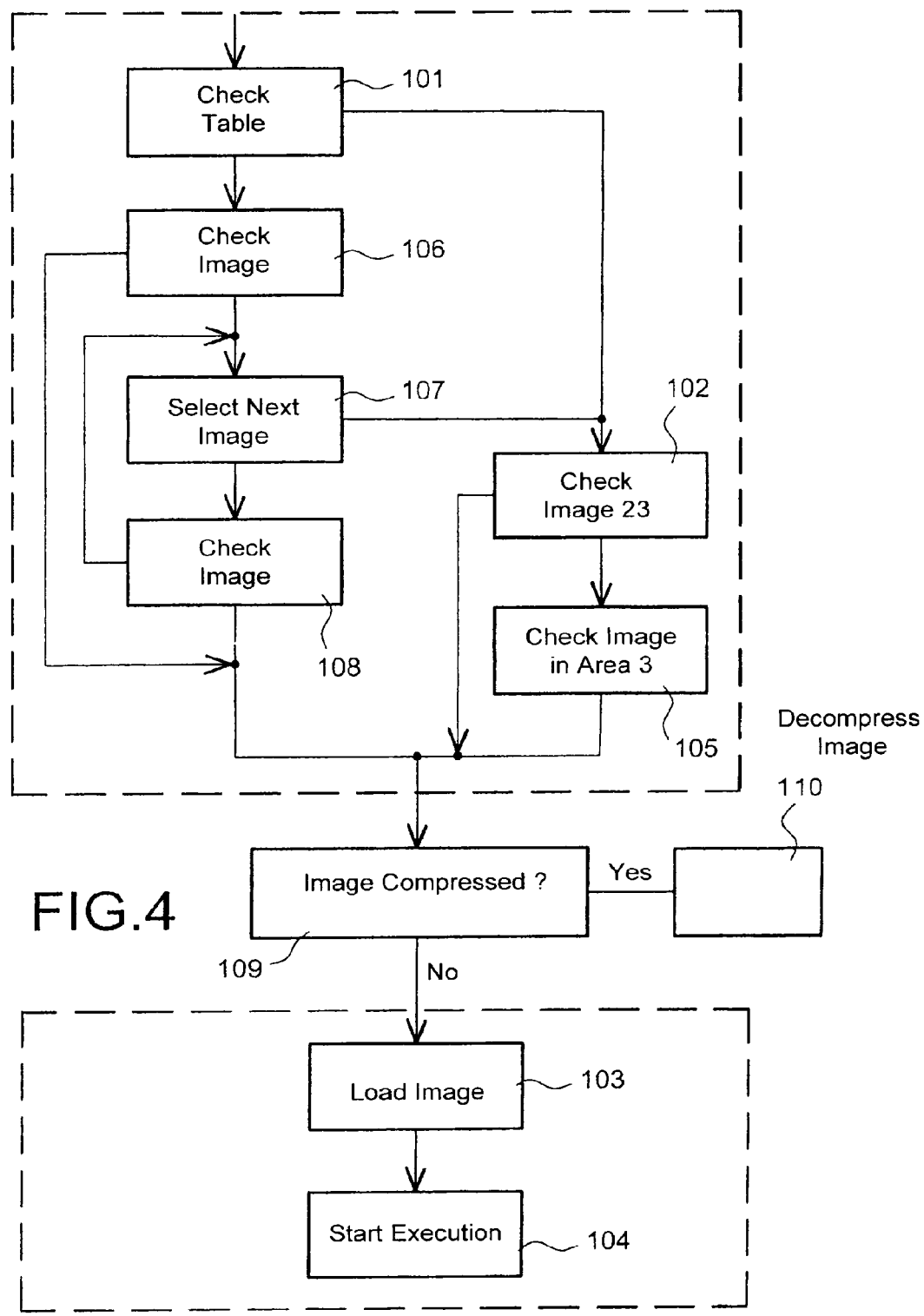
FIG. 4 is a flow chart showing the steps in the process according to the invention to select and then possibly load and run one of the executable software images loaded in one of the decoder storage means.

If no executable software image is uncorrupted, then as in prior art a loop not shown in FIG. 4 is executed, consisting of returning to the boot software which in a known manner starts loading an executable software from the digital data stream received by the decoder.

Optionally, if it is intended to store or load images from the stream of images in compressed form, then a step 109 to check the state of compression of the selected image is carried out before step 103 of loading the selected image in RAM. If the image is not compressed, then step 103 is carried out directly. If the image is compressed, for example using a ZIP code, then step 103 is carried out through a decompression step 110. The table attached to this description contains the text that appears in each of the boxes in the flow chart shown in FIG. 4.

APPENDIX

| 101 | 102 |
|---|---|
| Is there an address of an executable software image in the boot software table or is the boot software table itself uncorrupted? | Is the software image in the area of the hard disk with protection uncorrupted? |
| 103 | 104 |
| Load the selected executable software image into RAM memory if necessary | Run the selected executable software image |
| 105 | 106 |
| Is the executable software in the area of fast memory with protection uncorrupted? | Is the first uncorrupted software image on the hard disk uncorrupted? |
| 107 | 108 |
| Select the next image in the table | Is the next executable software image uncorrupted? |
| 109 | 110 |
| Is the selected image compressed? | Decompress the selected image |

The invention claimed is:

1. A method of selecting and running an executable software image in an apparatus, the method comprising:
    starting a self executable boot and load software stored in the apparatus configured to boot an executable software image;
    reading, by the self executable boot and load software, a table stored internally in the apparatus, the table referencing an integer number n greater than 1 of executable software images, the n executable software images being pre-stored in the apparatus in a predetermined order, each of the executable software images being independently bootable, the n images being distributed over two parts of the memory, a first number (n−m) of images being stored in an erasable part of a memory and a second, complementary number m of images, m being an integer number less than or equal to n, being stored in a part of the memory not erasable or having erase protection;

checking whether the table is present and uncorrupted before said reading;

selecting one uncorrupted executable software image from the executable software images that are referenced in the table; and booting the one executable software image chosen by said selecting, wherein the n executable software images are not downloaded to the apparatus in a current boot process.

2. The method according to claim 1, wherein the reading and the selecting further comprise:

reading the table following a predetermined order to read references of the table in an order of preference of the executable software images to which each reference corresponds, integrity checking that a first selected image corresponding to the first reference in the table reached by reading the table is uncorrupted, the first image only being selected when the integrity check of the first image is positive; and reading a next reference following the previous reference in the table in the predetermined read order when the first image or a previously checked image is corrupted, and reexecuting at least one of the selecting and starting operations when the current checked image is uncorrupted, and when the current checked image is corrupted then repeating the operation for the next reference in the order of reading the table, until an uncorrupted image is found and run.

3. The method according to claim 1, wherein the references in the table corresponding to the (n–m) images contained in the memory areas without erase protection are read first, and then if none of these images is selected, reading continues for the m images contained in the memory areas that are not erasable or that have erase protection.

4. The method according to claim 1, wherein when checking shows that the table is corrupted, at least one of the integrity checking and storing operations are carried out for the m images contained in the memory areas that are not erasable or that have erase protection.

5. The method according to claim 1, wherein the m images stored in the memory areas that are not erasable or with erase protection are stored on different media.

6. The method according to claim 1, wherein the memory areas without erase protection in which the (n–m) images belonging to the first part are stored, are memory areas on a hard disk.

7. The method according to claim 1, wherein the memory areas with erase protection in which the m images belonging to the second part are memory areas on a hard disk or a fast memory.

8. The method according to claim 1, before one of the images is run for execution, a check is made that this image is not stored in compressed mode, the image being decompressed before being loaded and executed if it is found to be compressed.

9. The method according to claim 1, wherein an integer number n of images is loaded prior to execution of the process, and distributed in a first part containing (n–m) images stored in memory areas without erase protection and a second part containing m images stored in memory areas with erase protection, and in that the reference table is created for the n images.

10. A digital television decoder or receiver comprising a processor and a storage unit, the processor configured to:

start a self executable boot and load software stored in the storage unit of the decoder or receiver, the self executable boot and load software being configured to boot an executable software image;

read, by the self executable boot and load software, a table that is stored internally in the decoder or receiver, the table referencing an integer number n greater than 1 of executable software images, the n executable software images being pre-stored in the storage unit in a predetermined order, each of the executable software images being independently bootable, the n images being distributed over two parts of the memory, a first number (n–m) of images being stored in an erasable part of a memory and a second, complementary number m of images, m being an integer number less than or equal to n, being stored in a part of the memory not erasable or having erase protection;

checking whether the table is present and uncorrupted before said reading;

select an one uncorrupted executable software image from the executable software images that are referenced in the table; and boot the one executable software image chosen by said selecting, wherein the n executable software images are not downloaded to the decoder or receiver in a current boot process.

11. The method according to claim 1, further comprising:
checking whether the one executable software image chosen from the executable software images that are referenced in the table is corrupted or not, after said selecting.

12. The method according to claim 11, further comprising:
selecting another executable software image that is referenced in said table, when the one executable software is determined to be corrupted in said checking.

13. The method according to claim 1, further comprising the steps of:

a first checking whether the table is corrupted or not;

a second checking whether the one executable software image selected from the n executable software images referenced in the table is corrupted or not, after said first checking has confirmed that the table is not corrupted;

copying the one selected executable software image to a random access memory; and a third checking whether the one selected executable software image in the random access memory is corrupted or not.

14. The digital television decoder or receiver according to claim 10, wherein the processor configured to:

perform a first check to see whether the table is corrupted or not;

perform a second check to see whether the one executable software image selected from the n executable software images referenced in the table is corrupted or not, after said first check has confirmed that the table is not corrupted;

copy the selected one executable software image to a random access memory; and perform a third check to see whether the selected one executable software image in the random access memory is corrupted or not.

15. The digital television decoder or receiver according to claim 14, wherein the selected one executable software image processes digital information received by the decoder or receiver into images, sounds and synchronization information.

* * * * *